(12) United States Patent
Washiro

(10) Patent No.: US 7,653,416 B2
(45) Date of Patent: Jan. 26, 2010

(54) WIRELESS COMMUNICATION SYSTEM, TRANSMITTER AND RECEIVER USED THEREFOR, AND WIRELESS COMMUNICATION METHOD

(75) Inventor: Takanori Washiro, Kanagawa (JP)

(73) Assignee: Sony Corporation (JP)

( * ) Notice: Subject to any disclaimer, the term of this patent is extended or adjusted under 35 U.S.C. 154(b) by 448 days.

(21) Appl. No.: 11/372,700

(22) Filed: Mar. 10, 2006

(65) Prior Publication Data

US 2006/0229031 A1    Oct. 12, 2006

(30) Foreign Application Priority Data

Mar. 10, 2005    (JP) .............................. 2005-068113

(51) Int. Cl.
*H04M 1/00*    (2006.01)

(52) U.S. Cl. .................. 455/562.1; 455/13.3; 455/63.4; 455/575.7

(58) Field of Classification Search .............. 455/562.1, 455/13.3, 575.7, 11.1, 63.4, 73, 78, 81, 550.1, 455/561, 91, 101, 130, 121, 82–83, 129, 455/560; 370/509–512; 375/130–133, 140–141; 343/702, 758, 776

See application file for complete search history.

(56) References Cited

U.S. PATENT DOCUMENTS

| | | | | |
|---|---|---|---|---|
| 5,583,515 A | * | 12/1996 | Marumoto | .................. 342/361 |
| 6,055,431 A | * | 4/2000 | Dybdal | ........................ 455/450 |
| 6,181,920 B1 | * | 1/2001 | Dent et al. | .................. 455/101 |
| 6,208,859 B1 | * | 3/2001 | Halvorson | ................. 455/430 |
| 6,233,435 B1 | * | 5/2001 | Wong | ........................ 455/103 |
| 6,275,704 B1 | * | 8/2001 | Dixon | ......................... 455/446 |
| 7,003,323 B2 | * | 2/2006 | Fischer et al. | ............. 455/562.1 |
| 2002/0198026 A1 | * | 12/2002 | Niemela | ..................... 455/562 |
| 2004/0009755 A1 | | 1/2004 | Yoshida | |
| 2004/0165675 A1 | | 8/2004 | Ito et al. | |

FOREIGN PATENT DOCUMENTS

| | | |
|---|---|---|
| JP | 2001-237757 | 8/2001 |
| JP | 2003-204317 | 7/2003 |
| JP | 2003-338781 A | 11/2003 |
| JP | 2004-200869 | 7/2004 |
| JP | 2004-254290 A | 9/2004 |

\* cited by examiner

*Primary Examiner*—Pablo N Tran
(74) *Attorney, Agent, or Firm*—Lerner, David, Littenberg, Krumholz & Mentlik, LLP

(57) ABSTRACT

A wireless communication system has a transmitter and a receiver. The transmitter includes a transmission-data-processing device that generates items of data for a first series and items of data for a second series, a transmission-processing device that generates transmission signals for each series based on these items of data, and a wireless-signal-transmitting device that transmits the transmission signals generated by the items of data for the first series and the items of data for the second series as wireless signals of an anti-clockwise polarized scheme and of a clockwise polarized scheme, respectively. The receiver includes a wireless-signal-receiving device that receives the wireless signals of the anti-clockwise polarized scheme and the clockwise polarized scheme, a reception-signal-processing device that generates the items of data for the first series based on the received wireless signal of the anti-clockwise polarized scheme and that generates the items of data for the second series based on the received wireless signal of the clockwise polarized scheme, and a received-data-outputting device that reconfigures the generated items of data.

7 Claims, 10 Drawing Sheets

US 7,653,416 B2

WIRELESS COMMUNICATION SYSTEM, TRANSMITTER AND RECEIVER USED THEREFOR, AND WIRELESS COMMUNICATION METHOD

CROSS-REFERENCE TO RELATED APPLICATIONS

The present application claims priority from Japanese Patent Application No. 2005-068113 filed on Mar. 10, 2005, the disclosure of which is hereby incorporated by reference herein.

BACKGROUND OF THE INVENTION

The present invention relates to a wireless communication system, a transmitter and a receiver used therefor, and a wireless communication method.

In a related wireless communication system, a transmitter and a receiver perform wireless communication to each other using limited frequency bandwidth, and hence, available communication speed is also limited. If wireless communication is performed using a wide frequency bandwidth in order to increase the communication speed thereof, any interference may often occur with another wireless communication apparatus that uses various frequencies, thereby causing any deterioration in communication quality. Multiple input multiple output (MIMO) communication such that separate pieces of information is transmitted at a same frequency using multiple sets of antennas has been carried out to increase the communication speed (see Japanese Patent Application Publications Nos. 2003-338781 and 2004-254290).

FIG. 1 is a drawing for illustrating a wireless communication system that performs the MIMO communication. It is to be noted that two antennas are used at the transmitter side and the receiver side, respectively. A data-splitting unit 501 of a transmitter 50t splits transmission data stream DT to be transmitted into two sub-streams DTa, DTb and supplies them to a matrix-calculating unit 502. The matrix-calculating unit 502 receives the sub-streams DTa, DTb from the data-splitting unit 501 and multiplies the sub-streams DTa, DTb by matrices corresponding to any channel assumptions so as to be weighted according to the channel assumptions, thereby generating the transmission signals DUa, Dub. A signal-transmitting unit 503a is connected to an antenna 60at. The signal-transmitting unit 503a receives the transmission signal DUa and performs any modulation and frequency-conversion on the transmission signal DUa to generate an RF signal Sat and supply it to the antenna 60at. Similarly, a signal-transmitting unit 503b is connected to an antenna 60bt. The signal-transmitting unit 503b receives the transmission signal DUb and performs any modulation and frequency-conversion on the transmission signal DUb to generate an RF signal Sbt that has the same frequency as that of the RF signal Sat generated in the signal-transmitting unit 503a and supply it to the antenna 60bt.

An antenna 60cr of a receiver 50r receives an RF signal Scr and supplies it to a signal-receiving unit 505c. An antenna 60dr of the receiver 50r receives an RF signal Sdr and supplies it to a signal-receiving unit 505d. The signal-receiving unit 505c performs any frequency-conversion and de-modulation on the RF signal Scr to generate a reception signal DQc and supply it to a matrix-calculating unit 506. The signal-receiving unit 505d performs any frequency-conversion and de-modulation on the RF signal Sdr to generate a reception signal DQd and supply it to the matrix-calculating unit 506.

The matrix-calculating unit 506 multiplies the reception signals DQc, DQd by matrices corresponding to any channel assumptions to extract a signal component transmitted from the antenna 60at and a signal component transmitted from the antenna 60bt, respectively, therefrom. The matrix-calculating unit 506 then supplies them to a data-reconfiguring unit 507 as sub-streams DRc, DRd. The data-reconfiguring unit 507 receives and reconfigures the sub-streams DRc, DRd to generate and output a reception data stream DR.

Thus, if the matrices are set corresponding to any channel assumptions, it is possible to extract only a signal transmitted from a desired antenna even when an antenna can receive signals transmitted from multiple antennas. If signals are transmitted from multiple antennas at the same frequency, it is possible to extract a signal transmitted from each of the antennas separately. When the extracted signals are reconfigured, original data can be given.

However, in the MIMO communication, the matrices are set corresponding to any channel assumptions and the multiplication by the matrices, the weighting, and an extraction of signal component have been performed. This causes a circuit to be complicated and expensive. Further, it is also preferable to establish any small correlation between transmission channels in order to extract a signal effectively. Thus, if a receiver is used in an outdoor channel where there is little reflected wave or an indoor channel in a wooded architecture, it is difficult to extract a signal effectively, in contrast with a case where the receiver is used in a multipath environment where there are many reflected waves. This may limit the communication speed. Alternatively, it is supposed that a reflected wave having a large amount of attenuation is used in the MIMO communication. Thus, it is difficult to expand a communication area with keeping a high communication speed.

In view of the above, it is desirable to provide a wireless communication system, a transmitter and a receiver used therefor, and a wireless communication method, which are simply configured and which enable the communication speed thereof to be easily increased.

SUMMARY OF THE INVENTION

According to an embodiment of the present invention, there is provided a transmitter including a transmission-data-processing device that splits transmission data to generate items of data for a first series and items of data for a second series; and a transmission-processing device that generates transmission signals each having a radio frequency for each series based on the items of data for the first series and the items of data for the second series. The transmitter also includes a wireless-signal-transmitting device that transmits the transmission signal generated by the items of data for the first series as a wireless signal of an anti-clockwise polarized scheme and the transmission signal generated by the items of data for the second series as a wireless signal of a clockwise polarized scheme.

Also, according to another embodiment of the present invention, there is provided a receiver including a wireless-signal-receiving device that receives the wireless signal of the anti-clockwise polarized scheme and the wireless signal of the clockwise polarized scheme; and a reception-signal-processing device that generates the items of data for the first series based on a signal obtained by receiving the wireless signal of the anti-clockwise polarized scheme and that generates the items of data for the second series based on a signal obtained by receiving the wireless signal of the clockwise polarized scheme. The receiver further includes received-data-outputting device that reconfigures the generated items of data for the first series and the generated items of data for the second series to produce received data and that outputs the received data.

Further, according to an embodiment of the present invention, there is provided a wireless communication system having the above transmitter and the above receiver.

Additionally, according to an embodiment of the present invention, there is provided a wireless communication method. The wireless communication method includes splitting transmission data to generate items of data for a first series and items of data for a second series; and generating transmission signals each having a radio frequency for each series based on the items of data for the first series and the items of data for the second series. The method also includes transmitting the transmission signal generated by the items of data for the first series as a wireless signal of an anti-clockwise polarized scheme and the transmission signal generated by the items of data for the second series as a wireless signal of a clockwise polarized scheme; receiving the wireless signal of the anti-clockwise polarized scheme and the wireless signal of the clockwise polarized scheme; and generating the items of data for the first series based on a signal obtained by receiving the wireless signal of the anti-clockwise polarized scheme and generating the items of data for the second series based on a signal obtained by receiving the wireless signal of the clockwise polarized scheme. The method additionally includes reconfiguring the generated items of data for the first series and the generated items of data for the second series to produce received data and outputting the received data.

According to the embodiments of the present invention, the transmission data is split into items of data for a first series and items of data for a second series. The transmission signals each having a radio frequency are generated for each series based on the items of data for the first series and the items of data for the second series. For example, a planar patch antenna having 2 feed points transmits the transmission signal generated by the items of data for the first series as a wireless signal of an anti-clockwise polarized scheme and the transmission signal generated by the items of data for the second series as a wireless signal of a clockwise polarized scheme. When receiving the wireless signal of the anti-clockwise polarized scheme and the wireless signal of the clockwise polarized scheme, the items of data for the first series and the items of data for the second series are generated based on the signals obtained by receiving the wireless signal of each of the anti-clockwise polarized scheme and the clockwise polarized scheme. The generated items of data for the first series and the generated items of data for the second series are reconfigured to produce received data and the received data is output. Thus, in each of the communication channels using the anti-clockwise polarized scheme and the clockwise polarized scheme, data can be separately transferred for each series and hence, it is possible to increase the communication speed thereof easily. Using two circularly polarized waves that do not interfere with each other and transmitting and receiving the wireless signals of two series at the same frequency band enables wider bandwidth to be eliminated. Further, it is possible to communicate the signals simultaneously along two communication channels without any complicated calculations for splitting the signals, thereby allowing the wireless communication system to be constructed inexpensively. Since any reflection wave is not necessary in the embodiments, high-speed communication using a direct wave that has less attenuation may be carried out for a long distance with keeping its high-speed.

In the embodiments, any communication of diversity scheme using multiple antennas can be carried out. If the planar patch antenna having 2 feed points is used, the wireless communication by the anti-clockwise polarized scheme and the clockwise polarized scheme can be performed by one antenna and hence, the transmitter or the receiver can be downsized. Further, in the embodiment, the transmitter and/or the receiver relative to the related art can be used as they are, and hence, any communication qualities can be further increased by performing any communication of diversity scheme using multiple antennas.

As communication operation modes, a split mode and an unsplit mode are provided in the embodiment. In the split mode, the items of data for the first series and the items of data for the second series resulting from the splitting of the transmission data by the transmission-data-processing device are transferred by the anti-clockwise polarized scheme and the clockwise polarized scheme, respectively. In the unsplit mode, the items of data for a first series or the items of data for a second series are transferred by one circularly polarized scheme without splitting the transmission data. Based on the received signals, any signal-receiving property is determined and the communication operation modes are switched based on the signal-receiving property. If the communication condition is good, communication using both the anti-clockwise polarized scheme and the clockwise polarized scheme is performed. If poor, the communication switches to communication using any one of the anti-clockwise polarized scheme and the clockwise polarized scheme. Therefore, it is possible to perform high-speed communication if the communication condition is good. In the embodiment, it is possible to implement communication speeds similar to those of the past communication devices even if the communication condition is poor.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

DETAILED DESCRIPTION

Figure 1:
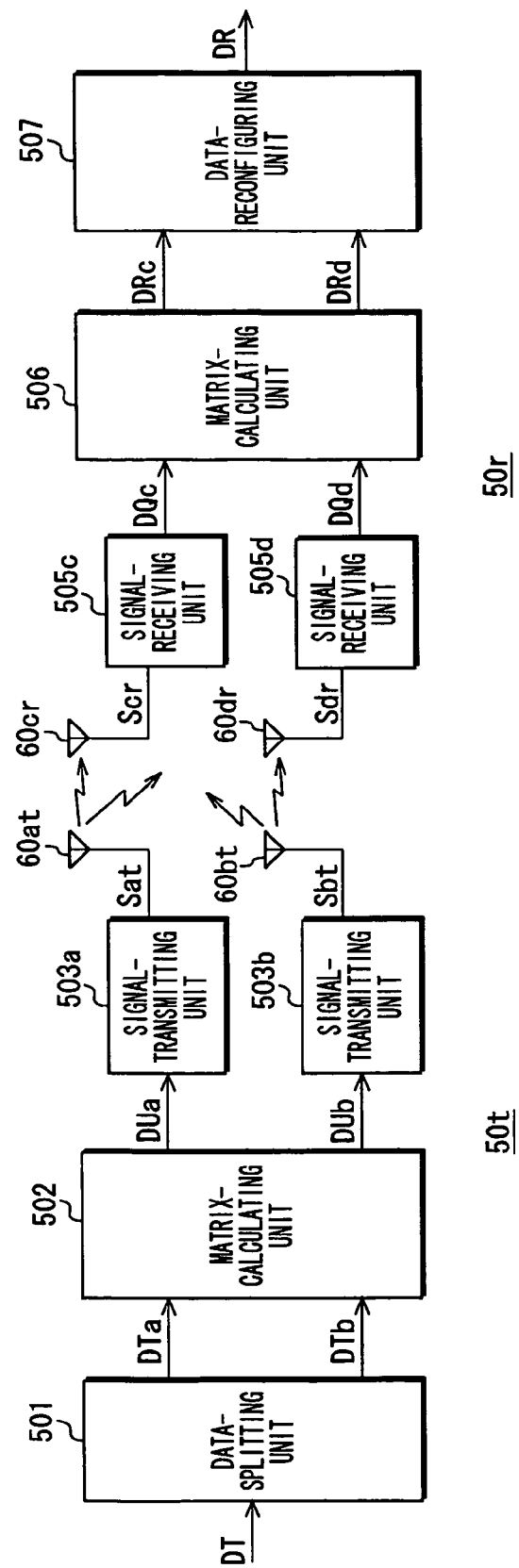
FIG. 1 is a block diagram for illustrating a configuration of a wireless communication system in which MIMO communication is performed.
Figure 2:
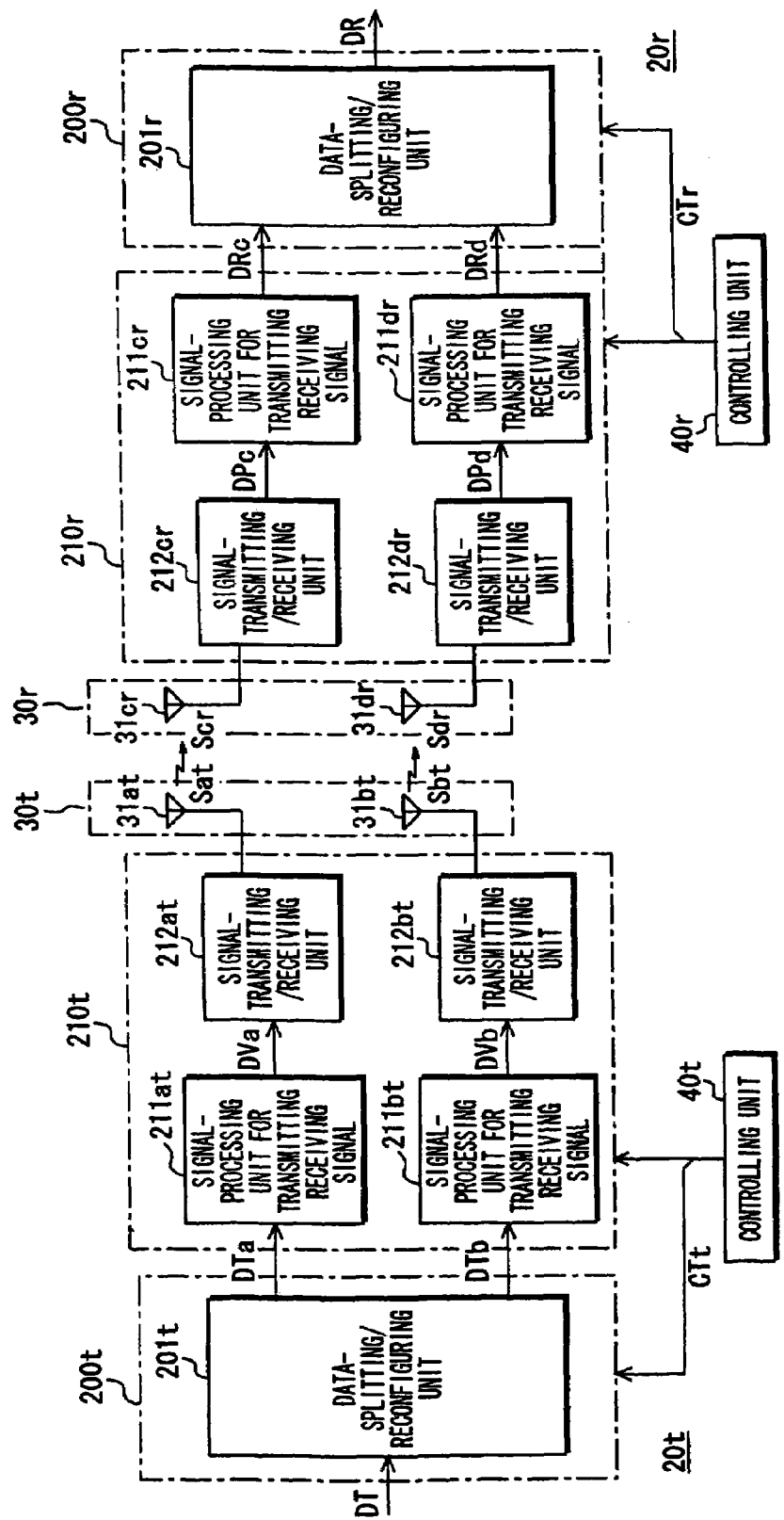
FIG. 2 is a block diagram for illustrating a configuration of an embodiment of a wireless communication system according to the invention.

The following will describe embodiments of the invention with reference to the accompanying drawings. FIG. 2 illustrates a configuration of an embodiment of a wireless communication system according to the invention. A communication apparatus used in the wireless communication system has a data-splitting/reconfiguring unit, two signal-transmitting/receiving units, two signal-processing units for transmitting/receiving a signal, antennas for transmitting or receiving a wireless signal using the anti-clockwise polarized scheme or the clockwise polarized scheme, and a controlling unit for controlling operations of the communication apparatus. In this embodiment, the communication apparatus for transmitting transmission data as the wireless signal is a transmitter 20$t$ and the communication apparatus for receiving the wireless signal to output reception data is a receiver 20$r$.

A transmission-data-processing block 200$t$ in the transmitter 20$t$ is constituted of a data-splitting/reconfiguring unit 201$t$. The data-splitting/reconfiguring unit 201$t$ splits transmission data stream DT into two sub streams DTa, DTb that are items of data of two series and supplies them to a transmission-processing block 210$t$. The data-splitting/reconfiguring unit 201$t$ splits the transmission data stream DT in bit units or byte units to generate the sub streams DTa, DTb. The data-splitting/reconfiguring unit 201$t$ can split the transmission data stream DT using any time division to generate the sub streams DTa, DTb.

A signal-processing unit 211$at$ for transmitting/receiving a signal in the transmission-processing block 210$t$ receives the sub streams DTa from the data-splitting/reconfiguring unit 201$t$, generates a transmission signal DVa based on the received sub streams DTa, and supplies the transmission signal DVa to a signal-transmitting/receiving unit 212$at$. A signal-processing unit 211$bt$ for transmitting/receiving a signal in the transmission-processing block 210$t$ receives the sub streams DTb from the data-splitting/reconfiguring unit 201$t$, generates a transmission signal DVb based on the received sub streams DTb, and supplies the transmission signal DVb to a signal-transmitting/receiving unit 212$bt$. The signal-processing units 211$at$, 211$bt$ packetize the received sub streams and add header information indicating a source address and/or a destination address, an error correction code and the like to the packetized data to generate a transmission signal of baseband.

The signal-transmitting/receiving unit 212$at$ receives the transmission signal DVa from the signal-processing unit 211$at$, performs modulation processing and frequency conversion processing on the transmission signal DVa to generate an RF transmission signal Sat having a radio frequency, and supplies the RF transmission signal Sat to an antenna 31$at$ in a wireless-signal-transmitting block 30$t$. The signal-transmitting/receiving unit 212$bt$ receives the transmission signal DVb from the signal-processing unit 211$bt$, performs modulation processing and frequency conversion processing on the transmission signal DVb to generate an RF transmission signal Sbt having the same frequency as that of the RF transmission signal, and supplies the RF transmission signal Sbt to an antenna 31$bt$ in the wireless-signal-transmitting block 30$t$.

The antennas 31$at$, 31$bt$ transmit the RF transmission signals using different circularly polarized schemes. For example, the antenna 31$at$ transmits the RF transmission signal Sat using the anti-clockwise polarized scheme and the antenna 31$bt$ transmits the RF transmission signal Sbt using the clockwise polarized scheme.

A controlling unit 40$t$ generates a communication control signal CTt and supplies it to the data-splitting/reconfiguring unit 201$t$, the signal-processing units 211$at$, 211$bt$, and the signal-transmitting/receiving units 212$at$, 212$bt$ to control operations of the units, thereby transmitting the transmission data stream DT as the wireless signal.

An antenna 31$cr$ in a wireless-signal-receiving block 30$r$ of the receiver 20$r$ receives the wireless signal of circularly polarized scheme to generate an RF reception signal Scr and supplies the RF reception signal Scr to a signal-transmitting/receiving unit 212$cr$ in a reception-processing block 210$r$. An antenna 31$dr$ in the wireless-signal-receiving block 30$r$ receives the wireless signal of circularly polarized scheme that is different from that of the signal received by the antenna 31$cr$ to generate an RF reception signal Sdr and supplies the RF reception signal Sdr to a signal-transmitting/receiving unit 212$dr$ in the reception-processing block 210$r$. For example, the antenna 31$cr$ receives the wireless signal of the anti-clockwise polarized scheme and the antenna 31$dr$ receives the wireless signal of the clockwise polarized scheme.

The signal-transmitting/receiving unit 212$cr$ receives the RF reception signal Scr from the antenna 31$cr$, performs frequency conversion processing and demodulation processing on the RF reception signal Scr to generate a reception signal DPc, and supplies the reception signal DPc to a signal-processing unit 211$cr$ for transmitting/receiving a signal. The signal-transmitting/receiving unit 212$dr$ receives the RF reception signal Sdr from the antenna 31$dr$, performs frequency conversion processing and demodulation processing on the RF reception signal Sdr to generate a reception signal DPd, and supplies the reception signal DPd to a signal-processing unit 211$dr$ for transmitting/receiving a signal.

The signal-processing unit 211$cr$ extracts the reception signal DPc destined for itself based on the header information of the reception signal DPc. The signal-processing unit 211$cr$ then performs error correction processing on the reception signal DPc to extract a sub stream DRc from the processed reception signal DPc, and supplies the sub stream DRc to a data-splitting/reconfiguring unit 201$r$ in a reception-data-processing block 200$r$. Similarly, the signal-processing unit 211$dr$ extracts the reception signal DPd destined for itself based on the header information of the reception signal DPd. The signal-processing unit 211$dr$ performs error correction processing on the reception signal DPd to extract a sub stream DRd from the processed reception signal DPd, and supplies the sub stream DRd to the data-splitting/reconfiguring unit 201$r$.

The data-splitting/reconfiguring unit 201$r$ performs any reverse processing that is opposite to that of the data-splitting/reconfiguring unit 201$t$ in the transmitter 20$t$. The data-splitting/reconfiguring unit 201$r$ then reconfigures the sub stream DRc received from the signal-processing unit 211$cr$ and the sub stream DRd received from the signal-processing unit 211*dr* and outputs the reconfigured stream as a reception data stream DR.

A controlling unit 40*r* generates a communication control signal CTr and supplies it to the data-splitting/reconfiguring unit 201*r*, the signal-processing units 211*cr*, 211*dr*, and the signal-transmitting/receiving units 212*cr*, 212*dr* to control operations of the units, thereby receiving the wireless signals and outputting the reception data stream DR.

Thus, in this embodiment, the transmitter splits the transmission data stream into two sub streams and transmits one sub stream as a wireless signal of an anti-clockwise polarized scheme and the other sub stream as a wireless signal of a clockwise polarized scheme. The receiver receives the wireless signal of an anti-clockwise polarized scheme to extract the sub stream thereof and the wireless signal of a clockwise polarized scheme to extract the sub stream and reconfigures the sub streams to output it as the reception data. Since the sub streams can be separately transferred via a communication channel using the anti-clockwise polarized scheme and a communication channel using the clockwise polarized scheme, respectively, in this embodiment, it is possible to increase the communication speed easily. Since two circularly polarized waves by the anti-clockwise polarized scheme and the clockwise polarized scheme that are not interfered with each other are used and the wireless signals of two series are transmitted or received at the same frequency band in this embodiment, it is possible to eliminate any need to use a wider bandwidth. Further, since it is possible to communicate the signals simultaneously via two communication channels without any complicated calculations for splitting the mixed signals as the past MIMO wireless communication in this embodiment, this allows the wireless communication system to be constructed inexpensively. Since any reflection wave is not necessary in the embodiments, which is different from the past MIMO wireless communication, any high-speed communication using direct wave that has less attenuation may be carried out for a long distance with keeping its high-speed.

Regarding the antennas 31*at*, 31*bt* used in the transmitter 20*t*, antenna of the anti-clockwise polarized scheme and the antenna of the clockwise polarized scheme can be separately provided. When, however, using a planar patch antenna having 2 feed points, only one antenna can transmit wireless signals of an anti-clockwise polarized scheme and a clockwise polarized scheme, thereby allowing the transmitter to be easily configured and inexpensive. Similarly, when using a planar patch antenna having 2 feed points as the antennas 31*cr*, 31*dr* used in the receiver 20*r*, the transmitter can be easily configured and inexpensive.

Figure 3:
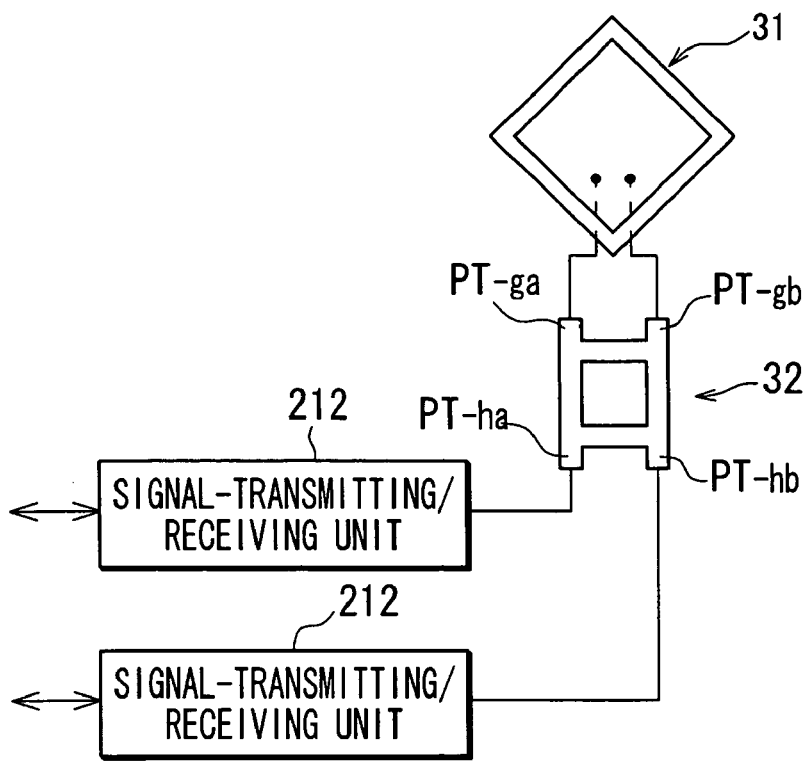
FIG. 3 is a diagram for illustrating a configuration of an apparatus that uses a planar patch antenna having two feed points.

FIG. 3 illustrates a configuration of an apparatus that uses the planar patch antenna having 2 feed points as its antenna. In this embodiment, when the planar patch antenna 31 having 2 feed points is used, a hybrid circuit 32 with a 90 degrees rotation is provided between the planar patch antenna 31 and the signal-transmitting/receiving units 212 in order to enable the wireless signal of an anti-clockwise polarized scheme and a clockwise polarized scheme to be transmitted or received.

Figure 4:
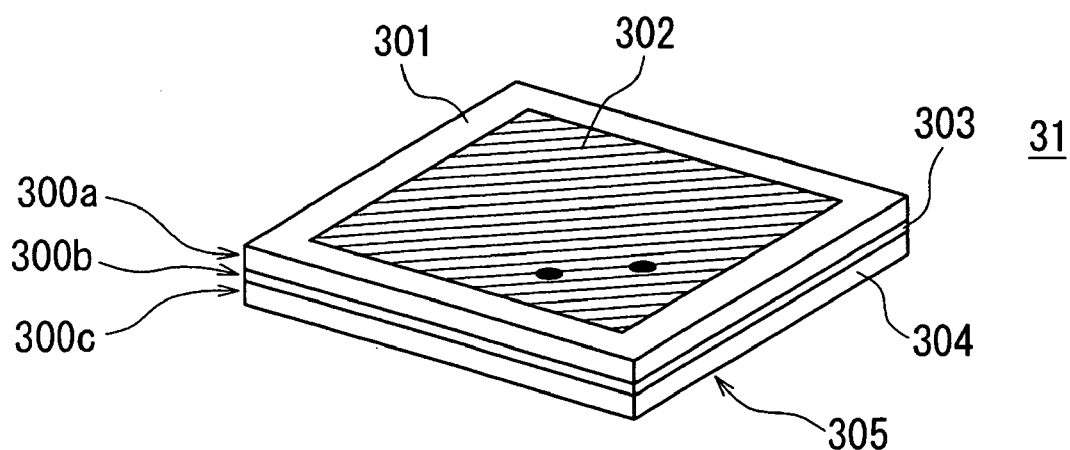
FIG. 4 is a perspective view of the planar patch antenna having two feed points.

FIG. 4 is a perspective view of the planar patch antenna 31 having two feed points, in which the hybrid circuit 32 with a 90 degrees rotation is built. The planar patch antenna 31 is constituted of a first layer 300*a* in which an electric conductor pattern 302 that is a radiating surface of electric wave is formed on insulator 301, a second layer 300*b* that is ground pattern 303, and a third layer 300*c* in which a conductor pattern 305 having the hybrid circuit 32 with a 90 degrees rotation is formed on insulator 304. These first to third layers 300*a*, 300*b*, 300*c* are laminated so that the insulator 301 can be sandwiched between the electric conductor pattern 302 and the ground pattern 303 as well as the insulator 304 can be sandwiched between the ground pattern 303 and the conductor pattern 305.

Figure 5A:
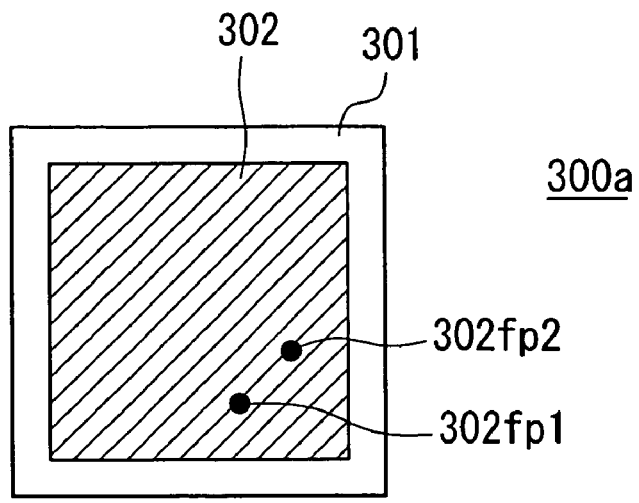
FIGS. 5A through 5C are diagrams each for showing a configuration of a layer constituting the planar patch antenna having two feed points.

FIG. 5 shows a configuration of each of the layers constituting the planar patch antenna 31. FIG. 5A shows the first layer 300*a* in which a rectangle electric conductor pattern 302, for example, that is a radiating surface of electric wave is formed on the insulator 301 and two feed points 302*fp*1, 302*fp*2 are provided on the electric conductor pattern 302. A size of the electric conductor pattern 302 can be set based on a frequency of the signal that the antenna transmits or receives. Positions of the two feed points 302*fp*1, 302*fp*2 can be also set so as to transmit or receive a signal efficiently with any small loss. Holes, for example, through holes, and VIA holes, which is not shown, for connecting the feed points 302*fp*1, 302*fp*2 and the hybrid circuit 32 with a 90 degrees rotation in the third layer 300*c* electrically are formed in the insulator 301 with them corresponding to the positions of the feed points 302*fp*1, 302*fp*2.

Figure 5B:
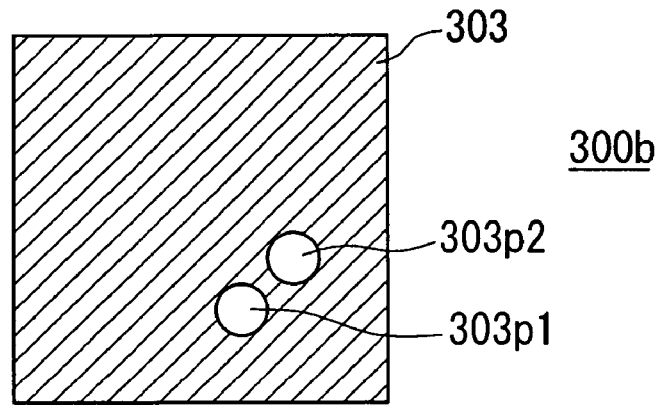

FIG. 5B shows the second layer 300*b* in which openings 303*p*1, 303*p*2 are formed in the ground pattern 303 with them corresponding to the holes such as through holes, and VIA holes (hereinafter, referred to as "VIA"), for connecting the feed points 302*fp*1, 302*fp*2 and the hybrid circuit 32 with a 90 degrees rotation electrically to prevent the feed points 302*fp*1, 302*fp*2 and the ground pattern 303 from being connected electrically through VIA.

Figure 5C:
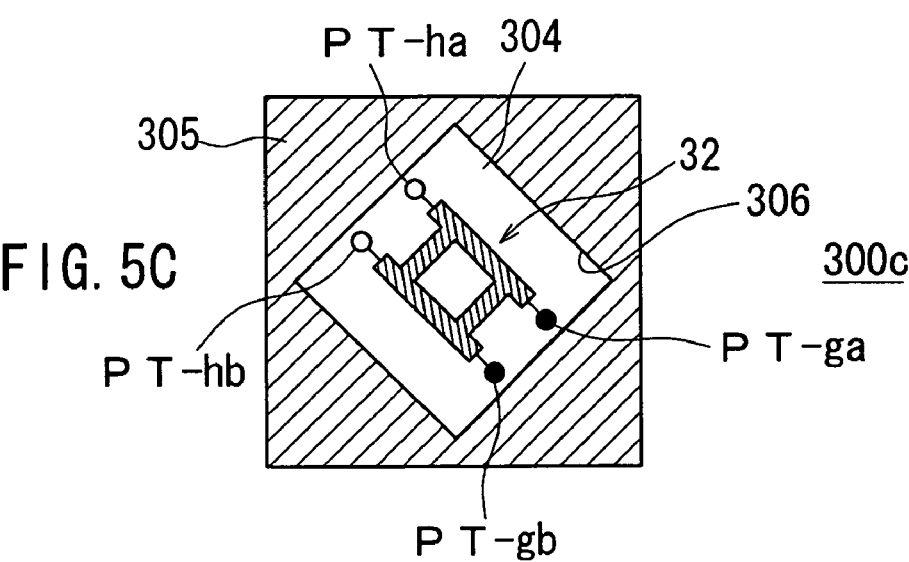

FIG. 5C shows the third layer 300*c* in which the conductor pattern 305 having a rectangle opening 306 is formed on the insulator 304 and the hybrid circuit 32 with a 90 degrees rotation is also formed as a circuit pattern on the insulator 304 with it included inside the opening 306. The conductor pattern 305 is used as a ground pattern and is electrically connected with the ground pattern 303 through VIA, which is not shown. It is to be noted that FIG. 5C shows the third layer 300*c* seen from a side that is opposite to those of FIGS. 5A and 5B in order to illustrate the conductor pattern 305 clearly.

A port PT-ga of the antenna side in the hybrid circuit 32 with a 90 degrees rotation is connected with the feed point 302*fp*1 through VIA, which is not shown. A port PT-gb of the antenna side in the hybrid circuit 32 with a 90 degrees rotation is connected with the feed point 302*fp*2 through VIA, which is not shown. A port PT-ha of the signal-transmitting/receiving unit side in the hybrid circuit 32 with a 90 degrees rotation is connected with the signal-transmitting/receiving unit 212*a* to transmit or receive the RF signal. A port PT-hb of the signal-transmitting/receiving unit side in the hybrid circuit 32 with a 90 degrees rotation is connected with the signal-transmitting/receiving unit 212*b* to transmit or receive the RF signal.

The hybrid circuit 32 with a 90 degrees rotation is constituted of a microstrip line. In the hybrid circuit 32 with a 90 degrees rotation, when signal power is input to the port PT-ha of the signal-transmitting/receiving unit side, for example, the port PT-ga of the antenna side outputs halved signal power and the port PT-gb of the antenna side outputs halved signal power with it being phase-shifted by 90 degrees with respect to the output of the port PT-ga of the antenna side. The port PT-hb of the signal-transmitting/receiving unit side outputs no signal power because the signal power is lost based on the phase shift. A length of pattern and a width of the pattern in the hybrid circuit 32 with a 90 degrees rotation can be set so as to match it's impedance with the one in the line that is connected with the hybrid circuit 32 with a 90 degrees rotation.

If a planar patch antenna 31 thus configured is used, the RF signal which the signal-transmitting/receiving unit 212a supplies to the planar patch antenna 31 and the RF signal which the signal-transmitting/receiving unit 212b supplies to the planar patch antenna 31 are transmitted using different circularly polarized schemes. The signals received by the planar patch antenna 31 are supplied to the signal-transmitting/receiving units 212a, 212b according to the anti-clockwise polarized scheme or the clockwise polarized scheme. In this embodiment, if a signal is supplied to a port of the signal-transmitting/receiving unit side, the other port of the signal-transmitting/receiving unit side does not output this signal. This enables the signal-transmitting/receiving units 212a, 212b to be communicated with each other with their inter-influence being reduced. Therefore, using a pair of the planar patch antennas allows the wireless communication system to be independently communicated using a communication channel of a first circularly polarized scheme and a communication channel of a second circularly polarized scheme.

In the planar patch antenna 31, the conductor pattern 302 radiates electric wave in a vertical direction (front direction or back direction thereof) with respect to the pattern surface. The ground pattern 303 of the second layer 300b decreases a gain in a direction from the conductor pattern 302 to the third layer 300c (back direction thereof). Unless the planar patch antenna of the transmission side and the planar patch antenna of the reception side are almost opposed, it is difficult to perform good communication.

Figure 6:
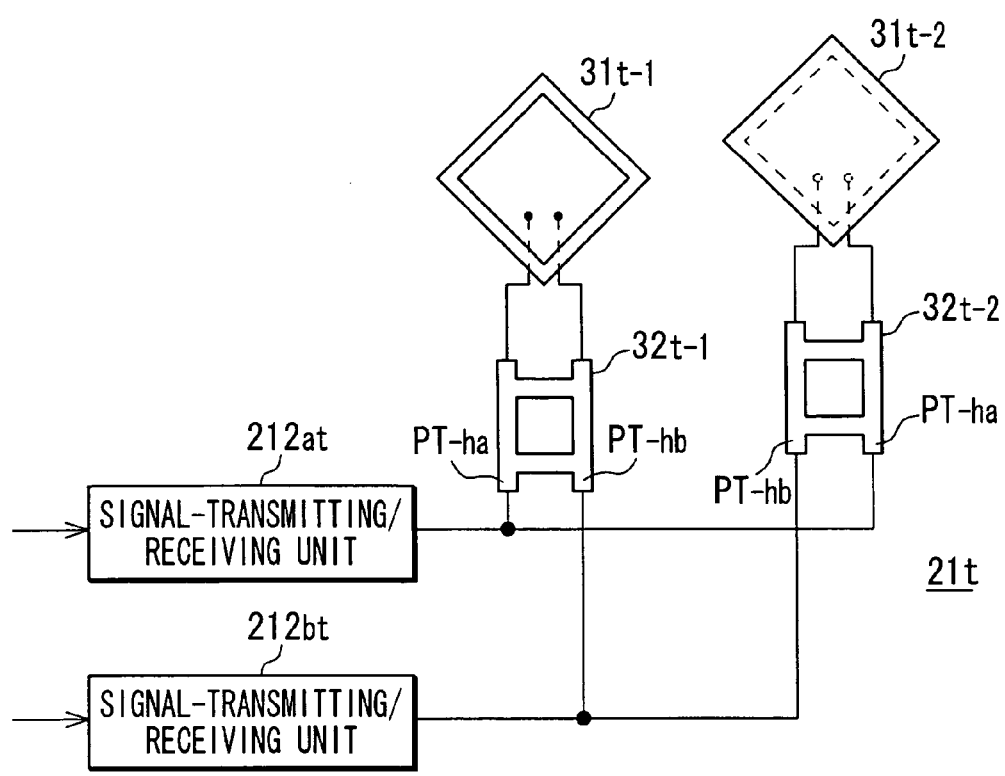
FIG. 6 is a diagram for illustrating a configuration of a part of a transmitter using two planar patch antennas each having two feed points.

The following describe a transmitter that can expand a radiation angle of electric wave thereof using multiple antennas. FIG. 6 illustrates a configuration of a part of a transmitter 21 using two planar patch antennas 31t-1, 31t-2. These two planar patch antennas 31t-1, 31t-2 have the same configuration.

In order to expand their radiation angle of electric wave, the planar patch antennas 31t-1, 31t-2 are positioned so that they can radiate electric wave in different directions. For example, they are positioned with back of the planar patch antenna 31t-1 to back of the planar patch antenna 31t-2. In such the configuration of the transmitter, a port PT-ha of the signal-transmitting/receiving unit side in the hybrid circuit 32t-1 with a 90 degrees rotation that is provided in the planar patch antenna 31t-1 and a port PT-ha of the signal-transmitting/receiving unit side in the hybrid circuit 32t-2 with a 90 degrees rotation that is provided in the planar patch antenna 31t-2 are respectively connected with the signal-transmitting/receiving unit 212a. Ports PT-hb of the signal-transmitting/receiving unit side in the hybrid circuits 32t-1, 32t-2 each with a 90 degrees rotation are respectively connected with the signal-transmitting/receiving unit 212b.

Such the configuration enables the planar patch antenna 31t-2 to transmit or receive electric wave to or from the back direction of the planar patch antenna 31t-1 in which only a small gain is given, thereby expanding an area where communication can be carried out.

Figure 7:
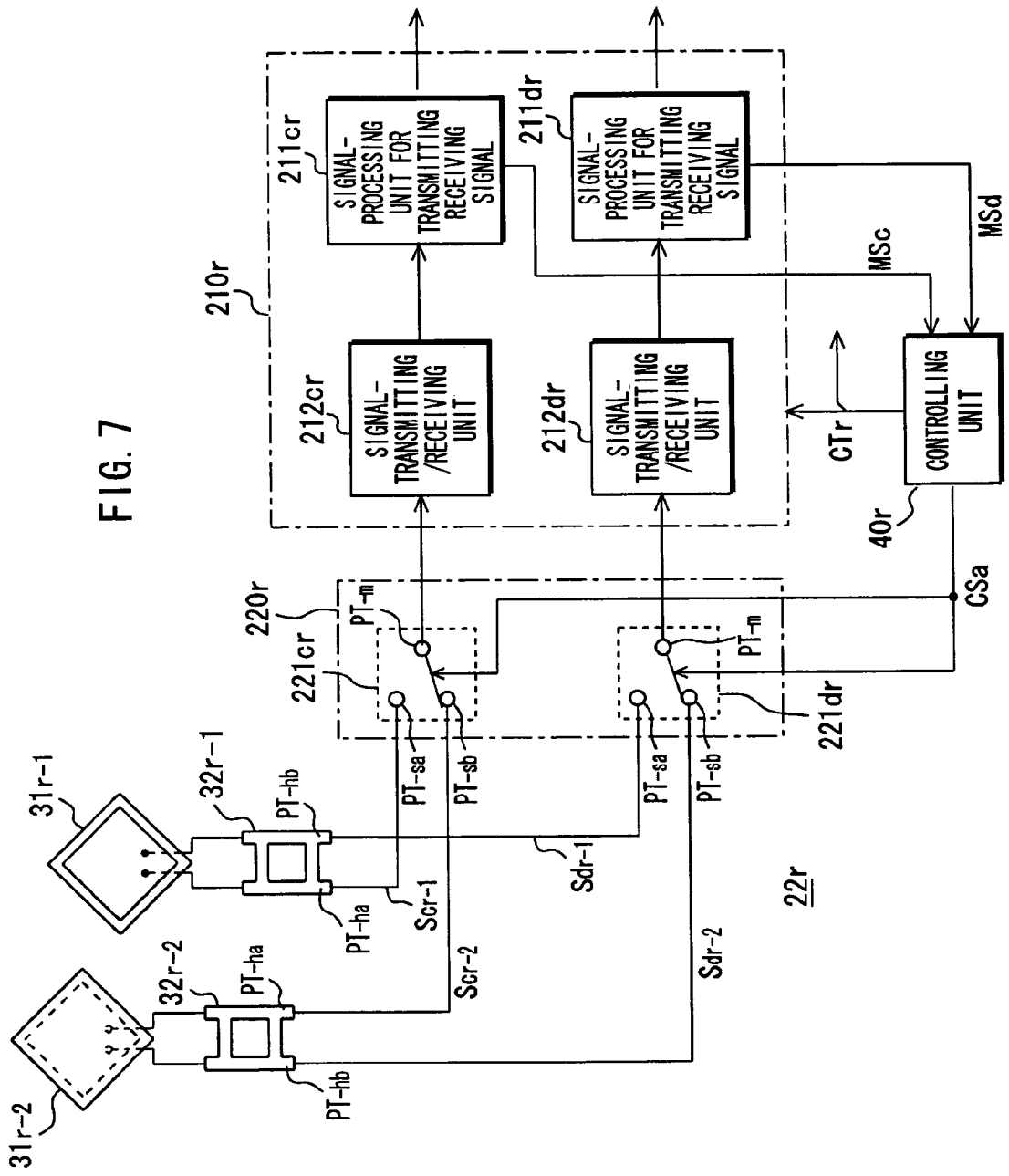
FIG. 7 is a diagram for illustrating a configuration of a part of a receiver for diversity receiving by using two planar patch antennas each having two feed points.

Using multiple planar patch antennas allows a diversity communication to be done. FIG. 7 illustrates a configuration of a part of a receiver for diversity receiving by using two planar patch antennas. The receiver 22r for diversity receiving has a signal selection block 220r for selecting the planar patch antenna to be used, which is positioned between the planar patch antennas and signal-transmitting/receiving units.

The signal-transmitting/receiving unit 212cr is connected to an input/output port PT-m in a signal selection portion 221cr of the signal selection block 220r. An input/output port PT-sa in the signal selection portion 221cr is connected to a port PT-ha of the signal-transmitting/receiving unit side in the hybrid circuit 32r-1 with a 90 degrees rotation and an input/output port PT-sb in the signal selection portion 221cr is connected to a port PT-ha of the signal-transmitting/receiving unit side in the hybrid circuit 32r-2 with a 90 degrees rotation.

The signal-transmitting/receiving unit 212dr is connected to an input/output port PT-m in a signal selection portion 221dr of the signal selection block 220r. An input/output port PT-sa in the signal selection portion 221dr is connected to a port PT-hb of the signal-transmitting/receiving unit side in the hybrid circuit 32r-1 with a 90 degrees rotation and an input/output port PT-sb in the signal selection portion 221dr is connected to a port PT-hb of the signal-transmitting/receiving unit side in the hybrid circuit 32r-2 with a 90 degrees rotation.

A signal-processing unit 211cr for transmitting/receiving a signal, which is connected to the signal-transmitting/receiving unit 212cr, detects signal-receiving property and supplies a property detection signal MSc indicating to its detection result to a controlling unit 40r. For example, the signal-processing unit 211cr detects error bit rate or S/N ratio as the signal-receiving property and supplies a property detection result as the property detection signal MSc to the controlling unit 40r. Similarly, a signal-processing unit 211dr for transmitting/receiving a signal, which is connected to the signal-transmitting/receiving unit 212dr, detects signal-receiving property and supplies a property detection signal MSd indicating to its detection result to the controlling unit 40r.

The signal selection portion 221cr selects any one of an RF signal Scr-1 received from the input/output port PT-sa thereof and an RF signal Scr-2 received from the input/output port PT-sb thereof based on a selection control signal CSa received from the controlling unit 40r and supplies the selected signal to the signal-transmitting/receiving unit 212cr through the input/output port PT-m in a signal selection portion 221cr. Similarly, the signal selection portion 221dr selects any one of an RF signal Sdr-1 received from the input/output port PT-sa thereof and an RF signal Sdr-2 received from the input/output port PT-sb thereof based on the selection control signal CSa received from the controlling unit 40r and supplies the selected signal to the signal-transmitting/receiving unit 212dr through the input/output port PT-m in a signal selection portion 221dr.

The controlling unit 40r in the receiver 22r controls operations of the signal selection portions 221cr, 221dr based on the selection control signal CSa to supply the RF signals Scr-1, Sdr-1 received by the planar patch antenna 31r-1 to the signal-transmitting/receiving units 212cr, 212dr where signal-receiving property when using the planar patch antenna 31r-1 is detected based on the property detection signals MSc, MSd. The controlling unit 40r also supplies the RF signals Scr-2, Sdr-2 received by the planar patch antenna 31r-2 to the signal-transmitting/receiving units 212cr, 212dr where signal-receiving property when using the planar patch antenna 31r-2 is detected based on the property detection signals MSc, MSd.

Thereafter, the controlling unit 40r controls operations of the signal selection portions 221cr, 221dr based on the selection control signal CSa to compare the signal-receiving properties when using the planar patch antennas 31r-1, 31r-2 with each other and to supply to the signal-transmitting/receiving units 212cr, 212dr an RF signal received from the planar patch antenna that has better signal-receiving property. Thus, it is possible to select from the multiple antennas the planar patch antenna that has better signal-receiving property and communicate a signal very well using such the antenna, thereby enabling any diversity receiving to be performed. The controlling unit 40r also generates communication control signal CTr as described above.

It is to be noted that although a configuration of the receiver performing any diversity receiving has been described relative to FIG. 7, the invention could well be applied to the transmitter performing any diversity transmitting. In this case, the transmitter receives wireless signals from the receiver to determine the antenna that has better signal-receiving property and supplies an RF signal to such the antenna and transmits the RF signal by this antenna.

Thus, when performing communication of diversity scheme, it is possible to use multiple antennas effectively, thereby enhancing communication quality therefor. In this embodiment, it is necessary to provide the antennas and the signal selection portions 221, thereby allowing any communication of diversity scheme to be easily performed using detection results of the signal-receiving properties.

It has been founded that if any communication using circularly polarized scheme is performed, an axial ratio alters based on a reflection of electric wave by a wall or the like. In other words, it has been founded that the reflected electric wave includes circularly polarized components that have a rotation in an identical direction to that of an original circularly polarized wave and circularly polarized components that have a rotation in a reverse direction to that of an original circularly polarized wave. Therefore, in any indoor channel environment in which electric wave is easily reflected, if any communication using circularly polarized scheme is performed, a signal transmitted from the signal-transmitting/receiving unit 212at through the planar patch antenna 31t using anti-clockwise polarized scheme is received by the planar patch antenna 31r and supplied to the signal-transmitting/receiving units 212cr. A part of components of the signal transmitted using anti-clockwise polarized scheme alters to a signal of clockwise polarized scheme by a reflection thereof, and hence, the planar patch antenna 31r receives such the part of components of this reflected signal and supplies these components to the signal-transmitting/receiving unit 212dr. Similarly, a signal transmitted from the signal-transmitting/receiving unit 212bt through the planar patch antenna 31t using clockwise polarized scheme is received by the planar patch antenna 31r and supplied to the signal-transmitting/receiving units 212dr. A part of components of the signal transmitted using clockwise polarized scheme alters to a signal of anti-clockwise polarized scheme by a reflection thereof, and hence, the planar patch antenna 31r receives such the part of components of this reflected signal and supplies these components to the signal-transmitting/receiving unit 212cr. Thus, in the signals received by the signal-transmitting/receiving units 212cr, 212dr, signals transmitted by the signal-transmitting/receiving units 212at, 212bt are mixed. This deteriorates D/U ratio and leads its signal-receiving property deterioration, thereby causing suitable wireless communication to be restricted.

If both of the signal-receiving property in a communication channel using anti-clockwise polarized scheme and the signal-receiving property in a communication channel using clockwise polarized scheme do not satisfy a condition that they have properties over a predetermined property, communication operation modes are switched so that transmission data stream can be communicated under an unsplit condition using a communication channel that has better signal-receiving quality than that the other communication channel has, thereby keeping communication speed identical to the past one.

Hereinafter, a communication operation mode where the transmission data stream is split and transmitted will be referred to as "split mode". A communication operation mode where the transmission data stream is unsplit and transmitted will be referred to as "unsplit mode".

Figure 8:
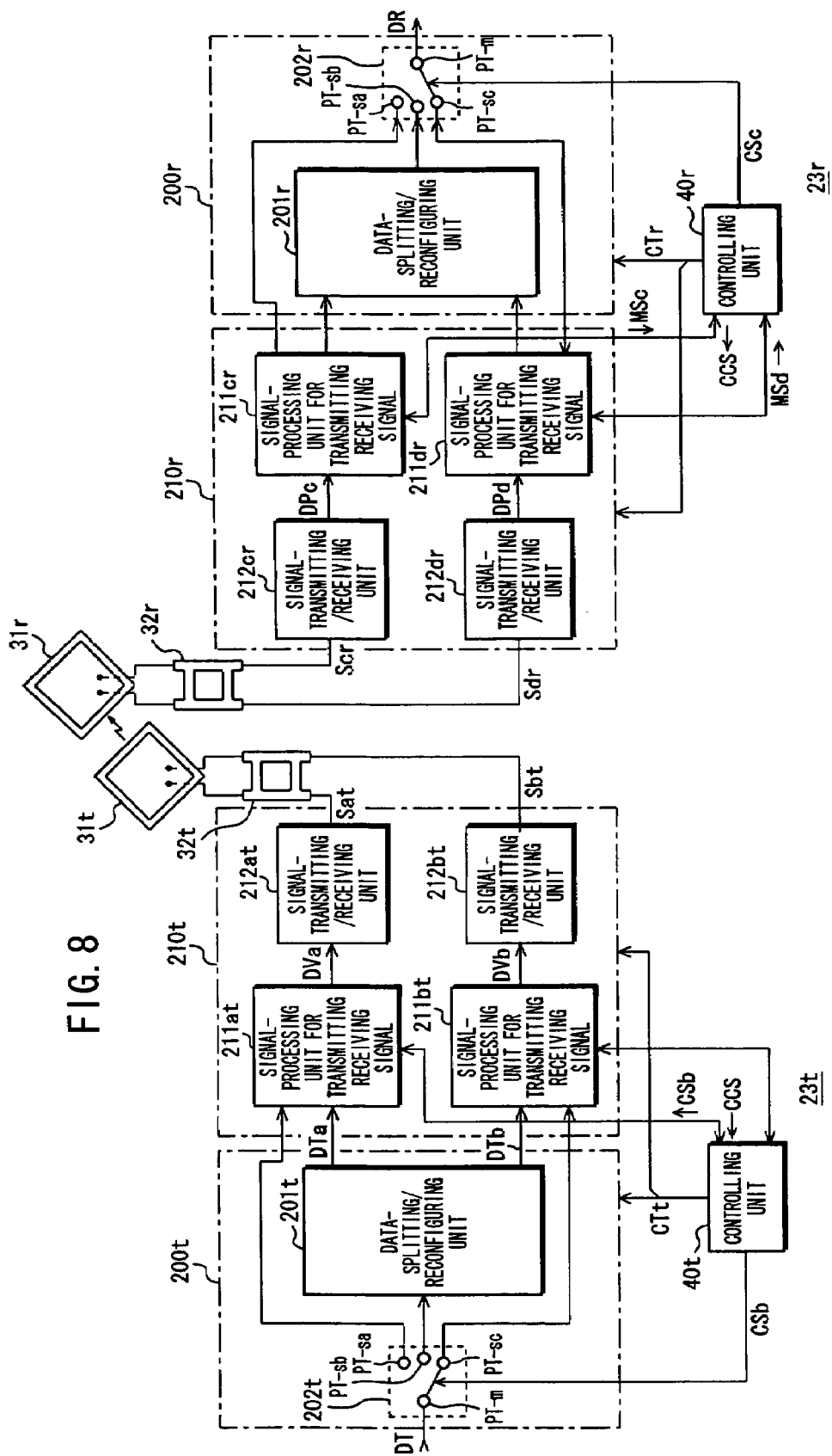
FIG. 8 is a diagram for illustrating a configuration of an embodiment of a wireless communication system according to the invention, which switches communication operation modes based on any signal-receiving properties.

FIG. 8 shows a configuration of an embodiment of a wireless communication system according to the invention, which switches the communication operation modes based on any signal-receiving properties. In FIG. 8, like reference numbers refer to like elements shown in FIGS. 2 and 3, a detailed explanation of which will be omitted.

A transmission-data-processing block 200t in the transmitter 23t is constituted of a signal selection portion 202t for supplying the transmission data DT selectively to the data-splitting/reconfiguring unit 201t, the signal-processing unit 211at for transmitting/receiving a signal, or the signal-processing unit 211bt for transmitting/receiving a signal. A reception-data-outputting block 200r in the receiver 23r is constituted of a signal selection portion 202r for outputting the stream received by the data-splitting/reconfiguring unit 201r, the signal-processing unit 211cr for transmitting/receiving a signal, or the signal-processing unit 211dr for transmitting/receiving a signal, selectively.

The transmission data is supplied to an input/output port PT-m of the signal selection portion 202t in the transmitter 23t. An input/output port PT-sa in the signal selection portion 202t is connected to the signal-processing unit 211at for transmitting/receiving a signal. An input/output port PT-sb in the signal selection portion 202t is connected to the data-splitting/reconfiguring unit 201t. An input/output port PT-sc in the signal selection portion 202t is connected to the signal-processing unit 211bt for transmitting/receiving a signal. The signal selection portion 202t switches the input/output port PT-m to connect it to any one of the ports PT-sa, PT-sb and PT-sc, thereby supplying the transmission data stream DT to any one of the signal-processing unit 211at, the signal-processing unit 211bt, and the data-splitting/reconfiguring unit 201t.

A signal-processing unit 211at receives the transmission data DT from the signal selection portion 202t or a sub streams DTa from the data-splitting/reconfiguring unit 201t, generates a transmission signal DVa based on the received transmission data DT or sub streams DTa, and supplies the transmission signal DVa to a signal-transmitting/receiving unit 212at. A signal-processing unit 211bt receives the transmission data DT from the signal selection portion 202t or a sub streams DTb from the data-splitting/reconfiguring unit 201t, generates a transmission signal DVb based on the received transmission data DT or sub streams DTb, and supplies the transmission signal DVb to a signal-transmitting/receiving unit 212bt. The signal-processing units 211at, 211bt adds to the transmission signal any mode information such that the communication operation mode is the split mode or the unsplit mode based on a selection control signal CSb. If such the mode information is included in the transmission signal, the receiver can determine a proper communication operation mode. Further, when mode control information CCS is supplied from the receiver 23r, which will be described, to the signal-processing units 211at, 211bt, they supply the mode control information CCS to the controlling unit 40t.

The signal-transmitting/receiving unit 212at receives the transmission signal DVa from the signal-processing unit 211at, generates an RF transmission signal Sat from the received transmission signal DVa, and supplies the RF transmission signal Sat to the planar patch antenna 31t to transmit a signal using a circularly polarized scheme. Similarly, the signal-transmitting/receiving unit 212bt receives the transmission signal DVb from the signal-processing unit 211bt, generates an RF transmission signal Sbt from the received transmission signal DVb, and supplies the RF transmission signal Sat to the planar patch antenna 31t to transmit a signal using a circularly polarized scheme that is different from that of the RF signal Sat.

The controlling unit 40t of the transmitter 23t generates the selection control signal CSb based on the mode control information CCS received from the signal-processing units 211at, 211bt and supplies it to the signal selection portion 202t, thereby controlling a supply of the transmission data stream DT. For example, if it is determined that a request for switching the communication operation mode to the unsplit mode based on the mode control information CSS has been performed, the controlling unit 40t generates a selection control signal CSb so that the transmission data stream DT can be supplied to a signal-processing unit for transmitting/receiving a signal of a side of communication channel to which the mode control information CCS is supplied. Further, if any set switching condition is satisfied after the communication operation mode has been switched, the communication operation mode is then switched to the split mode and the transmission data stream DT is supplied to the data-splitting/reconfiguring unit 201t by which the sub streams DTa, DTb are transferred via the separate communication channels. As the switching condition, it is determined whether a predetermined period of time after switching the mode to the unsplit mode has been elapsed. If elapsed, the communication operation mode is switched to the split mode. When a request for switching the communication operation mode to the split mode is done based on the mode control information CCS, it is also possible to switch the mode to the split mode.

The controlling unit 40t supplies the selection control signal CSb to the signal-processing units 211at, 211bt, thereby adding the mode information to the transmission signal, as described above. It is to be noted that the controlling unit 40t can generate communication control signal CTt.

The signal-transmitting/receiving unit 212cr of the receiver 23r receives the RF reception signal Scr that is obtained from a signal of circularly polarized scheme received by the planar patch antenna 31r, converts the RF reception signal Scr to a reception signal DPc, and supplies the reception signal DPc to a signal-processing unit 211cr for transmitting/receiving a signal. Similarly, the signal-transmitting/receiving unit 212dr receives the RF reception signal Sdr that is obtained from a signal of different circularly polarized scheme received by the planar patch antenna 31r, converts the RF reception signal Sdr to a reception signal DPd, and supplies the reception signal DPd to a signal-processing unit 211dr for transmitting/receiving a signal.

The signal-processing unit 211cr supplies a stream that is obtained by processing the reception signal DPc to the input/output port PT-sa in the signal selection portion 202r and the data-splitting/reconfiguring unit 201r. The signal-processing unit 211cr then detects any signal-receiving property and supplies the property detection signal MSc indicating the detection result to a controlling unit 40r. Similarly, the signal-processing unit 211dr supplies a stream that is obtained by processing the reception signal DPd to the input/output port PT-sc in the signal selection portion 202r and the data-splitting/reconfiguring unit 201r. The signal-processing unit 211dr then detects any signal-receiving property and supplies the property detection signal MSd indicating the detection result to the controlling unit 40r.

If each of the reception signals DPc, DPd includes any mode information, the signal-processing units 211cr, 211dr extract the mode information and supply it to the controlling unit 40r. When the controlling unit 40r supplies the mode control information CCS to the signal-processing units 211cr, 211dr, the signal-processing units 211cr, 211dr generate a transmission signal based on the mode control information CCS to supply this mode control information CCS to the transmitter 23t and supply the generated transmission signal to the signal-transmitting/receiving unit 212cr or 212dr to output it from the planar patch antenna 31r.

The data-splitting/reconfiguring unit 201r reconfigures the sub stream DTa received from the signal-processing units 211cr and the sub stream DTb received from the signal-processing units 211dr and supplies the reconfigured stream to the input/output port PT-sb in the signal selection portion 202r.

The controlling unit 40r of the receiver 23r generates the mode control information CCS for requesting a switch of the communication operation modes based on the property detection signals MSc, MSd that are received from the signal-processing units 211cr, 211dr. The controlling unit 40r selects a communication channel based on the property detection signals MSc, MSd and supplies the mode control information CCS to the signal-processing unit for transmitting/receiving a signal, which corresponds to the selected communication channel. Namely, the controlling unit 40r generates a signal for requesting the switch of the communication operation modes to the unsplit mode as the mode control information CCS if both of the signal-receiving property in the signal-processing unit 211cr and the signal-receiving property in the signal-processing unit 211dr do not satisfy a condition that they have properties over a predetermined property. The controlling unit 40r compares the signal-receiving properties in the signal-processing units 211cr, 211dr and supplies the mode control information CCS to a signal-processing unit for transmitting/receiving a signal that has better property. It is to be noted that when in generating the mode control information CCS, S/N ratio detected in the signal-processing units 211cr, 211dr becomes very well, it is possible to generate the signal for requesting the switch of communication operation modes to the split mode in this embodiment.

The controlling unit 40r also generates selection control signal CSc based on the mode information received from the signal-processing units 211cr, 211dr and supplies it to the signal selection portion 202r to control operations of the signal selection portion 202r so that the reception-data-outputting block 200r can output a data stream transmitted by the transmitter 23t properly. It is to be noted that the controlling unit 40r can also generate a communication control signal CTr.

The signal selection portion 202r selects a data stream among the data streams received from the signal-processing units 211cr, 211dr and the data-splitting/reconfiguring unit 201r. If the communication operation mode is the unsplit mode, the signal selection portion 202r selects and outputs the stream received from the signal-processing unit 211cr or 211dr as the reception data stream DR. If the communication operation mode is the split mode, the signal selection portion 202r selects and outputs the stream received from the data-splitting/reconfiguring unit 201r as the reception data stream DR.

Thus, in this embodiment, even if a case where it is difficult to generate a suitable signal-receiving property occurs, the transmission data stream is unsplit and transmitted via a communication channel using the anti-clockwise polarized scheme or the clockwise polarized scheme as data of one series. This allows its communication speed to be kept to the same degree as that of communication speed of the past one. If both of the signal-receiving property in the signal-processing unit 211cr and the signal-receiving property in the signal-processing unit 211dr have properties over a predetermined property, the communication is performed via two communication channels, thereby increasing the communication speed.

If the communication operation mode is the unsplit mode, the controlling units 40t, 40r allow consumed power of the transmitter and/or the receiver to be reduced when stopping a power supply to the signal-processing unit 211 for transmitting/receiving a signal and the signal-transmitting/receiving unit 212, which are not related to any communication.

Figure 9:
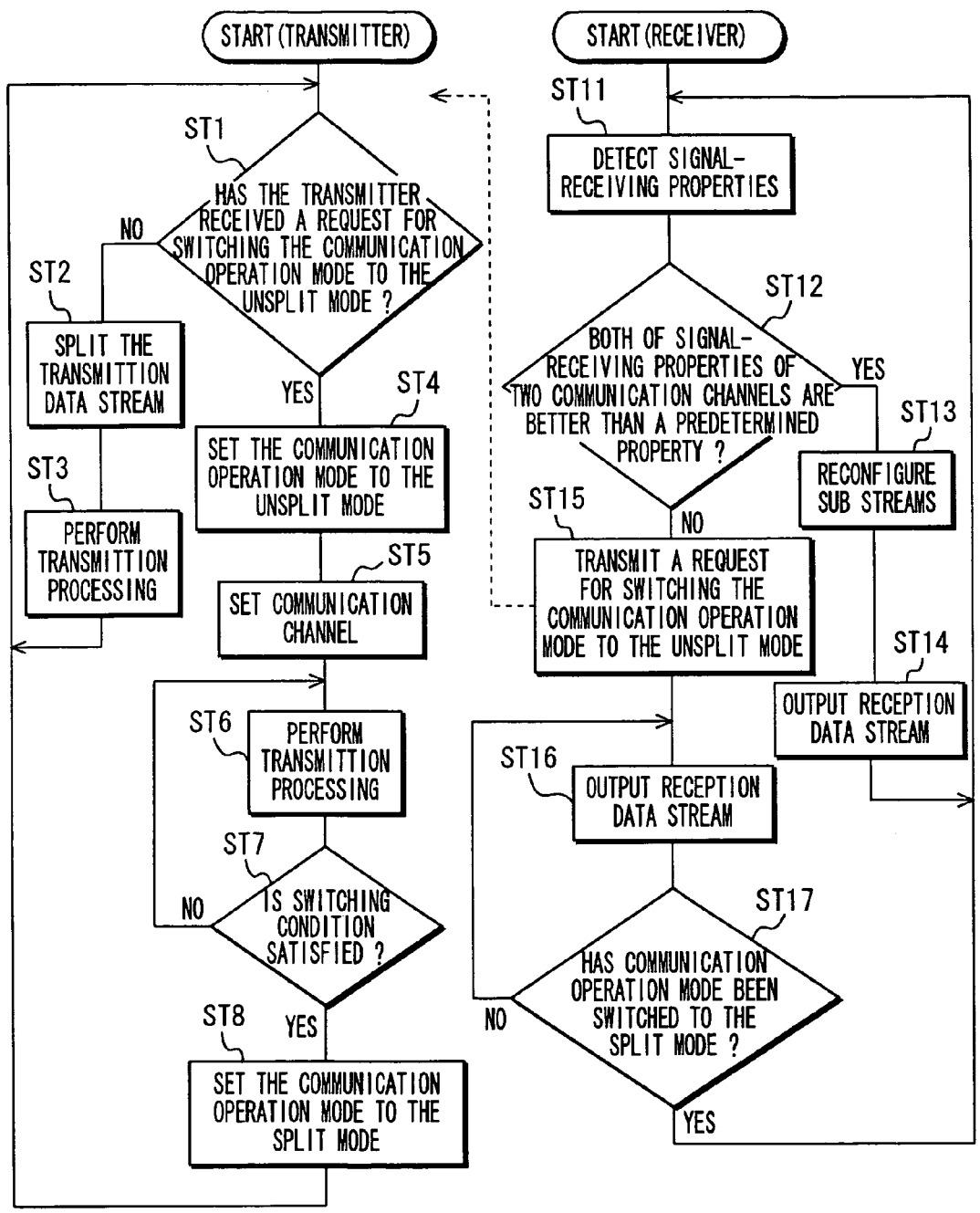
FIG. 9 is a flowchart showing an example of operations of a wireless communication system according to the invention, which switches communication operation modes based on any signal-receiving properties.

FIG. 9 is a flowchart for showing an example of operations of a wireless communication system according to the invention, which switches the communication operation modes based on any signal-receiving properties.

The communication apparatuses of the transmission side and the reception side can switch between the split mode in which the transmission data stream is split and a communication can be performed via both of two communication channels, namely, a communication channel using a first circularly polarized scheme and a communication channel using a second circularly polarized scheme, and the unsplit mode in which the transmission data is unsplit and a communication can be performed via a single communication channel. For example, operation starts in the split mode.

At step ST1, the transmitter determines whether it has received a request for switching the communication operation mode to the unsplit mode from the receiver, which will be described later. If the transmitter has not yet received the request for switching the mode to the unsplit mode, the process goes to step ST2. If the transmitter has already received the request for switching the mode to the unsplit mode, the process goes to step ST4.

At the step ST2, the transmitter splits the transmission data stream into two sub streams with them corresponding to numbers of the communication channels to be communicated because the communication operation mode is the split mode.

At step ST3, the transmitter performs any transmission processing to transmit these two sub streams via the separate communication channels, respectively. The process then goes back to the step ST1.

At the step ST4, the transmitter switches its communication operation modes to the unsplit mode, and the process then goes to step ST5.

At the step ST5, the transmitter sets the communication channel. If the request for switching the communication operation mode to the unsplit mode is carried out via a communication channel that has good signal-receiving property, which will be described later, the transmitter determines any communication channel through which the request is carried out, thereby enabling the communication channel that has good signal-receiving property to be determined. The transmitter sets the communication channel through which the request for switching the communication operation mode to the unsplit mode is carried out to the communication channel to be used for the communication.

At step ST6, the transmitter transmits the transmission data without splitting it via the communication channel set in the step ST5 and the process then goes to step ST7.

At the step ST7, the transmitter determines whether a switching condition for switching the communication operation mode to the split mode is satisfied. For example, if a predetermined period of time is elapsed or the receiver requests the transmitter to switch its mode to the split mode after the mode has been switched to the unsplit mode, the process goes to step ST8. If the switching condition is not satisfied, the process goes back to the step ST6.

At step ST8, the transmitter sets its communication operation mode to the split mode and the process then goes back to the step ST1. If the signal to be transmitted includes any mode information indicating a communication operation mode in order to enable the receiver to determine that the mode of the transmitter has been switched to the split mode, the receiver can properly determine that the mode of the transmitter has been switched to the split mode.

At step ST11, the receiver detects any signal-receiving properties based on signals received via two communication channels. Namely, as the signal-receiving property, an S/N ratio or an error rate is detected for each communication channel, and the process goes to step ST12.

At the step ST12, the receiver determines whether a condition where both of the signal-receiving properties of these two communication channels are better than a predetermined property is satisfied. Namely, both of an S/N ratio and an error rate detected for each communication channel as the signal-receiving properties are better than a predetermined reference property, the signal-receiving properties of these two communication channels are determined as to be better. The process then goes to step ST13. If a condition where both of the signal-receiving properties of these two communication channels are better than a predetermined property is not satisfied, the process goes to step ST15.

At the step ST13, the receiver reconfigures the sub streams received via the two communication channels and the process then goes to step ST14. At the step ST14, the receiver outputs the reconfigured sub streams as the reception data stream and the process goes back to the step ST11.

At the step ST15, the receiver transmits a request for switching the communication operation mode to the unsplit mode and the process the goes to the step ST16. In this case, the receiver transmits the request using a communication channel that has better signal-receiving property than that of the other communication channel in order to allow the transmitter to receive the request properly.

At step ST16, the receiver outputs the received stream of unsplit mode as the reception data stream and the process then goes to step ST17.

At the step ST17, the receiver determines whether the communication operation mode has been switched to the split mode. If the received signal includes any mode information indicating a switch to the split mode, the process goes back to the step ST11. If the communication operation mode has not been switched to the split mode, the process goes back to the step ST16.

Thus, if no good signal-receiving property is given, the transmission data stream can be unsplit and transmitted via one communication channel in this embodiment, and hence it is possible to keep the same communication speed as that of the past one. If both of the signal-receiving properties of these two communication channels are better than a predetermined property, two communication channels can be used and hence, it is possible to increase the communication speed.

Figure 10:
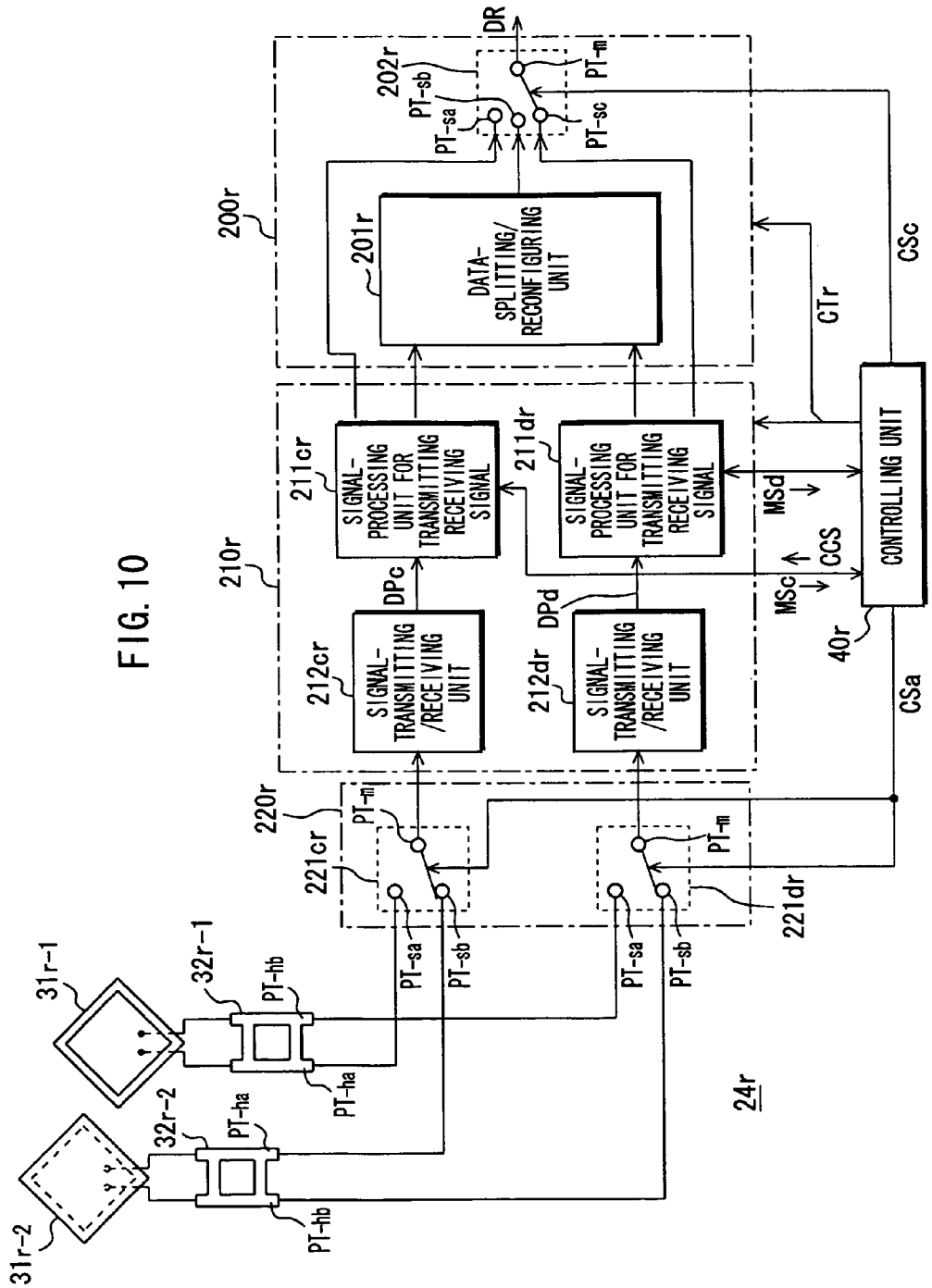
FIG. 10 is a diagram for illustrating a configuration of an embodiment of a wireless communication system according to the invention, in which the reception using the diversity scheme and the switch of communication operation modes are performed together.

Alternatively, if transmission or reception using the above diversity scheme and a switch of the communication operation modes are performed together, it is possible to perform good communication efficiently. FIG. 10 illustrates a configuration of a part of an embodiment of a receiver according to the invention, in which the reception using the diversity scheme and the switch of communication operation modes are performed together. It is to be noted that like reference characters shown in FIG. 10 refer to like elements shown in FIGS. 2, 3, 7 and 8.

The signal-transmitting/receiving unit 212cr of the receiver 24r is connected to an input/output port PT-m in a signal selection portion 221cr of the signal selection block 220r. An input/output port PT-sa in the signal selection portion 221cr is connected to a port PT-ha of the signal-transmitting/receiving unit side in the hybrid circuit 32r-1 with a 90 degrees rotation and an input/output port PT-sb in the signal selection portion 221cr is connected to a port PT-ha of the signal-transmitting/receiving unit side in the hybrid circuit 32r-2 with a 90 degrees rotation.

The signal-transmitting/receiving unit 212dr is connected to an input/output port PT-m in a signal selection portion 221dr of the signal selection block 220r. An input/output port PT-sa in the signal selection portion 221dr is connected to a port PT-hb of the signal-transmitting/receiving unit side in the hybrid circuit 32r-1 with a 90 degrees rotation and an input/output port PT-sb in the signal selection portion 221dr is connected to a port PT-hb of the signal-transmitting/receiving unit side in the hybrid circuit 32r-2 with a 90 degrees rotation.

A signal-processing unit 211cr for transmitting/receiving signal, which is connected to the signal-transmitting/receiving unit 212cr, supplies a stream obtained by processing the received signal DPc to an input/output port PT-sa of signal selection portion 202r and a data-splitting/reconfiguring unit 201r. The signal-processing unit 211cr detects any signal-receiving property as described above and supplies property detection signal MSc indicating to its detection result to a controlling unit 40r. Similarly, the signal-processing unit 211dr for transmitting/receiving signal, which is connected to the signal-transmitting/receiving unit 212dr, supplies a stream obtained by processing the received signal DPd to an input/output port PT-sc of signal selection portion 202r and the data-splitting/reconfiguring unit 201r. The signal-processing unit 211dr detects any signal-receiving property and supplies property detection signal MSd indicating to its detection result to the controlling unit 40r.

In order to supply any mode control information to the transmitter, the signal-processing units 211cr, 211dr also generate transmission signals based on the mode control information CCS and supplies them to the signal-transmitting/receiving unit 212cr or 212dr when receiving the mode control information CCS from the controlling unit 40r.

Based on the selection control signal CSa, the controlling unit 40r in the receiver 24r controls the signal selection portions 221cr, 221dr to switch planar patch antennas to be selected. The controlling unit 40r also detects a planar patch antenna that has better signal-receiving property based on the property detection signals MSc, MSd received from the signal-processing units 211cr, 211dr when the planar patch antenna 31r-1 is selected and the property detection signals MSc, MSd received from the signal-processing units 211cr, 211dr for transmitting/receiving the signal when the planar patch antenna 31r-2 is selected. The controlling unit 40r generates the selection control signal CSa to select the detected planar patch antenna and perform the communication therethrough and supplies the signal CSa to the signal selection portions 221cr, 221dr.

The controlling unit 40r also generates the mode selection information CCS, as described above, based on the property detection signals MSc, MSd supplied from the signal-processing units 211cr, 211dr when performing any communication using the selected planar patch antenna. The controlling unit 40r then selects a communication channel based on the property detection signals MSc, MSd and supplies the mode control information CCS to a signal-processing unit for transmitting/receiving the signal corresponding to the selected communication channel. Further, the controlling unit 40r generates the selection control signal CSc based on the mode information supplied from the signal-processing units 211cr, 211dr, supplies it to the signal selection portion 202r, controls operations of the signal selection portion 202r to allow the data stream transmitted from the transmitter 23t to be properly output from the reception-data-outputting block 200r. It is to be noted that the controlling unit 40r can also generates communication control signal CTr.

The signal selection portion 221cr selects an RF signal received through the input/output port PT-sa or PT-sb based on the selection control signal CSa received from the controlling unit 40r and supplies the RF signal thus selected to the signal-transmitting/receiving unit 212cr through the input/output port PT-m. Namely, the RF signal that the planar patch antenna determined that the signal-receiving property thereof is good radiates is supplied to the signal-transmitting/receiving unit 212cr. Similarly, the signal selection portion 221dr selects an RF signal received through the input/output port PT-sa or PT-sb based on the selection control signal CSa received from the controlling unit 40r and supplies the RF signal that the planar patch antenna determined that the signal-receiving property thereof is good radiates to the signal-transmitting/receiving unit 212dr.

The signal selection portion 202r selects any one of the signal-processing unit 211cr or 211dr, and the data-splitting/reconfiguring unit 201r based on the selection control signal CSc to output as the reception data stream DR any of a stream received from the signal-processing unit 211cr, a stream received from the data-splitting/reconfiguring unit 201r, and a stream received from the signal-processing unit 211dr.

Although the receiver has been described relative to FIG. 10, this invention is not limited thereto. In this embodiment, a transmitter can perform the transmission using the diversity scheme and the switch of communication operation modes together. In this case, the transmitter can receive wireless signal from the receiver, determine an antenna that has better signal-receiving property, and perform operations of the above transmitter 23t using the determined antenna.

Thus, in this embodiment, if performing the communication using the diversity scheme and the switch of communication operation modes together, it is further possible to carry out the communication very well.

Figure 11:
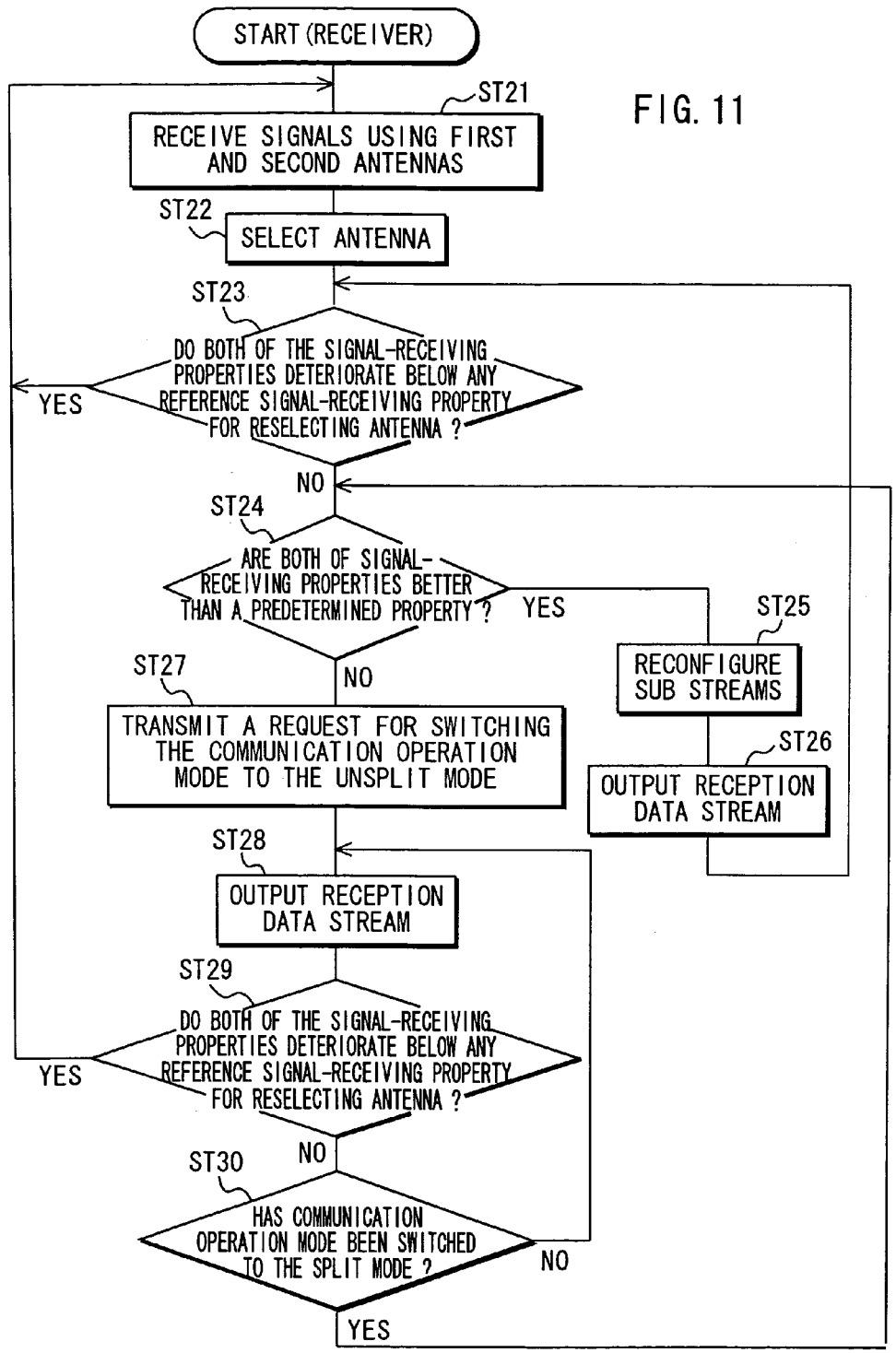
FIG. 11 is a flowchart showing an example of operations of a receiver according to the invention, which performs the communication using the diversity scheme and the switch of communication operation modes together.

FIG. 11 is a flowchart showing an example of operations of a wireless communication system according to the invention, which performs the communication using the diversity scheme and the switch of communication operation modes together.

At step ST21, the receiver receives signals using a first planar patch antenna and a second planar patch antenna and the process then goes to step ST22.

At the step ST22, the receiver compares the signal-receiving property when the first planar patch antenna is used with the signal-receiving property when the second planar patch antenna is used and selects the planar patch antenna that has better signal-receiving property. The process then goes to step ST23.

At the step ST23, the receiver determines whether both of the signal-receiving properties by two communication channels deteriorate below any reference signal-receiving property for reselecting an antenna. In other words, a level that deteriorates below the signal-receiving property used for determination of the switch of the communication operation modes, as described above, is set to the reference signal-receiving property for reselecting an antenna (for example, property below which any communication is prohibited). If both of signal-receiving properties by two communication channels deteriorate below the reference signal-receiving property for reselecting the antenna, the process goes back to step ST21. If not, the process goes to step ST24.

At the step ST24, the receiver determines whether both of the signal-receiving properties by two communication channels are better than a predetermined property. If both of them are better than the predetermined property, the process goes to step ST25. If not, the process goes to step ST27.

At the step ST25, the receiver reconfigures the sub streams received via the two communication channels and the process then goes to step ST26. At the step ST26, the receiver outputs the reconfigured sub streams as the reception data stream and the process goes back to the step ST23.

At the step ST27, the receiver transmits a request for switching the mode to the unsplit mode using a communication channel that has better signal-receiving property and the process then goes to the step ST28.

At step ST28, the receiver outputs the received stream of unsplit mode as the reception data stream and the process then goes to step ST29.

At the step ST29, the receiver determines whether both of the signal-receiving properties by two communication channels deteriorate below any reference signal-receiving property for reselecting an antenna, like in the step ST23. If both of them deteriorate below the reference signal-receiving property for reselecting the antenna, the process goes back to the step ST21. If not, the process goes to step ST30.

At the step ST30, the receiver determines whether the communication operation mode has been switched to the split mode. If the received signal includes any mode information indicating a switch to the split mode, the process goes back to the step ST24. If the communication operation mode has not been switched to the split mode, the process goes back to the step ST28.

If the transmitter performs the transmission using the diversity scheme and the switch of communication operation modes together, the transmitter can receive wireless signal from the receiver and performs the above steps ST21 to ST23, and then it can perform operations of the transmitter shown in FIG. 9.

Thus, in this embodiment, if performing the transmission using the diversity scheme and the switch of communication operation modes together, it is further possible to carry out the communication very well.

The present invention could well be preferably applied to a wireless communication system in which in any limited frequency bands, high-speed communication can be carried out.

It should be understood by those skilled in the art that various modifications, combinations, sub-combinations and alternations may occur depending on design requirements and other factors insofar as they are within the scope of the appended claims or the equivalents thereof.

What is claimed is:

1. A wireless communication system, comprising:
   a transmitter including:
      a transmission-data-processing unit operable to split transmission data to generate items of data for a first series and items of data for a second series,
      a transmission-processing unit operable to generate transmission signals each having a radio frequency for each series based on the items of data for the first series and the items of data for the second series, and
      a wireless-signal-transmitting unit operable to transmit the transmission signal generated based on the items of data for the first series as a wireless signal of an anti-clockwise polarized scheme and the transmission signal generated based on the items of data for the second series as a wireless signal of a clockwise polarized scheme; and
   a receiver including:
      a wireless-signal-receiving unit operable to receive the wireless signal of the anti-clockwise polarized scheme and the wireless signal of the clockwise polarized scheme,
      a reception-signal-processing unit operable to generate the items of data for the first series based on a signal obtained by receiving the wireless signal of the anti-clockwise polarized scheme and to generate the items of data for the second series based on a signal obtained by receiving the wireless signal of the clockwise polarized scheme, and
      a received-data-outputting unit operable to reconfigure the generated items of data for the first series and the generated items of data for the second series to produce received data and to output the received data;
   wherein the transmitter further includes a signal transmitting-controlling unit operable to control operations of the transmission-data-processing unit and the transmission processing unit, and
   the signal-transmitting-controlling unit switches between a split mode and an unsplit mode, in the split mode the transmission data being split by the transmission-data-processing unit into the items of data for the first series and the items of data for the second series, and the items of data for the first series and the items of data for the second series being supplied to the transmission processing unit and then transmitted, and in the unsplit mode, the items of data for the first series and the items of data for the second series being supplied to the transmission-processing unit without splitting by the transmission-data-processing unit and then transmitted.

2. The wireless communication system according to claim 1, wherein the reception-signal-processing unit determines signal-receiving properties of the received signals; and the signal-transmitting-controlling unit switches between the split mode and the unsplit mode based on the signal-receiving properties.

3. The wireless communication system according to claim 2, wherein after switching to the unsplit mode, the signal-transmitting-controlling unit switches the communication operation mode to the split mode when a set switching condition is satisfied.

4. The wireless communication system according to claim 1, wherein the receiver further includes an output-controlling unit operable to control an operation of the received-data-outputting unit; and the output-controlling unit controls the received-data-outputting unit, if receiving the wireless signal transmitted in the split mode, to reconfigure the items of data for the first series and the items of data for the second series that are generated by the reception-signal-processing unit, to produce received data and to output the received data, and if receiving the wireless signal transmitted in the unsplit mode, to output any one of the items of data for the first series and the items of data for the second series that are generated by the reception-signal-processing unit.

5. A transmitter, comprising:
   a transmitter including:
      transmission-data-processing means that splits transmission data to generate items of data for a first series and items of data for a second series,
      transmission-processing means that generates transmission signals each having a radio frequency for each series based on the items of data for the first series and the items of data for the second series, and
      wireless-signal-transmitting means that transmits the transmission signal generated based on the items of data for the first series as a wireless signal of an anti-clockwise polarized scheme and the transmission signal generated based on the items of data for the second series as a wireless signal of a clockwise polarized scheme; and a receiver including:
- wireless-signal-receiving means that receives the wireless signal of the anti-clockwise polarized scheme and the wireless signal of the clockwise polarized scheme,
- reception-signal-processing means that generates the items of data for the first series based on a signal obtained by receiving the wireless signal of the anti clockwise polarized scheme and that generates the items of data for the second series based on a signal obtained by receiving the wireless signal of the clockwise polarized scheme, and
- received-data-outputting means that reconfigures the generated items of data for the first series and the generated items of data for the second series to produce received data and that outputs the received data;

wherein the transmitter further includes a signal transmitting-controlling unit operable to control operations of the transmission-data-processing unit and the transmission processing unit, and the signal-transmitting-controlling unit switches between a split mode and an unsplit mode, in the split mode the transmission data being split by the transmission-data-processing unit into the items of data for the first series and the items of data for the second series, and the items of data for the first series and the items of data for the second series being supplied to the transmission-processing unit and then transmitted, and in the unsplit mode, the items of data for the first series and the items of data for the second series being supplied to the transmission-processing unit without splitting by the transmission-data-processing unit and then transmitted.

6. The transmitter according to claim 5, wherein the signal-transmitting-controlling unit switches between the split mode and the unsplit mode based on signal-receiving properties of the wireless signal of the anti-clockwise polarized scheme and the wireless signal of the clockwise polarized scheme.

7. The transmitter according to claim 5, wherein after switching to the unsplit mode, the signal-transmitting-controlling unit switches the communication operation mode to the split mode when a set switching condition is satisfied.

* * * * *